United States Patent [19]

Heuer et al.

[11] 4,451,750
[45] May 29, 1984

[54] PROTECTIVE ARRANGEMENT FOR A PLUG-CONNECTED ELECTRIC MOTOR SEALED AGAINST PRESSURE, VAPORS AND RADIATION

[75] Inventors: Dieter Heuer, Wenden; Georg Schmiedke, Friedberg, both of Fed. Rep. of Germany

[73] Assignee: Elektro-Mechanik GmbH, Fed. Rep. of Germany

[21] Appl. No.: 344,042

[22] Filed: Jan. 29, 1982

[30] Foreign Application Priority Data

Mar. 2, 1981 [DE] Fed. Rep. of Germany ... 8102601[U]

[51] Int. Cl.³ .................................................. H02K 5/10
[52] U.S. Cl. ....................................... 310/88; 310/71; 339/94 R
[58] Field of Search ............................ 310/88, 87, 71; 339/14 R, 60 R, 94 R, 91 R; 376/277, 288

[56] References Cited

U.S. PATENT DOCUMENTS

| | | | |
|---|---|---|---|
| 2,542,404 | 2/1951 | Ensign | 339/91 R |
| 2,619,515 | 11/1952 | Doane | 339/94 R |
| 2,829,288 | 4/1958 | Schaefer | 310/87 |
| 2,944,297 | 7/1960 | Maynard | 310/87 |
| 2,967,960 | 1/1961 | Waldschmidt | 310/87 |
| 3,952,218 | 4/1976 | Deters | 310/71 |

*Primary Examiner*—J. D. Miller
*Assistant Examiner*—D. Rebsch
*Attorney, Agent, or Firm*—McGlew and Tuttle

[57] ABSTRACT

An electric motor construction comprises a housing with a motor rotor rotatably mounted in the housing with stator windings disposed in the housing around the rotor. The housing has a wall with an opening therein and a terminal box plug connector for the stator windings is mounted on the wall around the opening and includes an upper and a lower interengageable connector parts. A sealing gasket disposed between the parts which may be plug interconnected and held into position by a snap action lock. The stator windings have lead wires leading from the housing into the connector part and a continuous sealing compound resistant to humidity, vapors and gamma radiation embeds the stator windings and the lead wires and extends from the housing into the connector parts.

5 Claims, 3 Drawing Figures

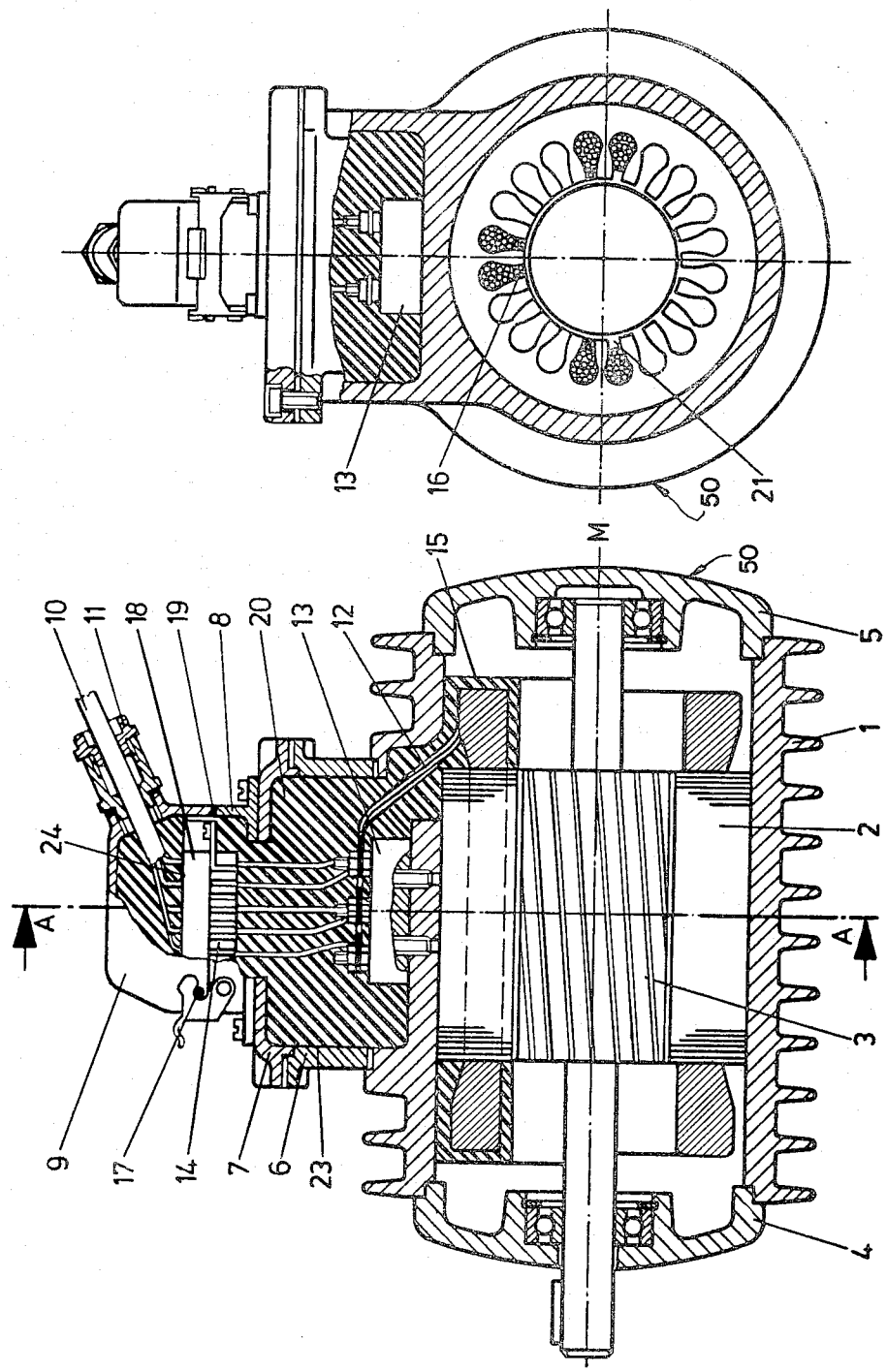

PROTECTIVE ARRANGEMENT FOR A PLUG-CONNECTED ELECTRIC MOTOR SEALED AGAINST PRESSURE, VAPORS AND RADIATION

FIELD AND BACKGROUND OF THE INVENTION

This invention relates in general to electric motors and in particular to a new and useful electric motor construction in which the stator windings are led out of the housing into a terminal box plug connector which may comprise only two connector parts mounted directly on the housing, having connector pins to which the stator coil windings are connected and which is embedded with a resin material which also extends through the opening of the housing and into the housing and embeds the stator windings.

Motors having some sealing compound protection are employed for actuating and controlling the operation of accessories, valves, etc., in ambiences, for example in nuclear plants, where in instances of a coolant loss due to a failure, radioactive and aggressive vapors may be liberated, so that the insulation of the motor windings is attacked. Motors of this kind may also be used for other purposes in rooms exposed to an aggressive gas-and-vapor-atmosphere. Up to the present time, electric motors of the IP 65 type of protection and of the insulation classes F or H have been employed for these purposes. This type of protection is satisfactory if an electric motor is exposed to a vapor atmosphere, for example, only temporarily, i.e. for a short time. Tests have shown, however, that with motors thus protected and exposed to a vapor atmosphere continually, i.e. for the long period of time, the insulating varnish of the winding is attacked by the vapors, so that the resistance of the insulation may strongly decrease and creeping current-flow across windings may occur as a result.

SUMMARY OF THE INVENTION

To ensure the insulating properties of the windings even over long periods of exposure to vapors or radiation, the invention is directed to an improvement of the design of motors of the above mentioned kind, to the effect that the connection of the motor to the current supply is also made hermetic.

With the invention the stator windings are led either directly to a connector insert having connector pins or first through a terminal box having a connector housing mounted thereon which includes interengageable connector parts which may be snap locked together. In addition, with the invention the connector parts, as well as a terminal box as it is employed, are filled with resin which embeds the connecting wires and extends into the housing and over the stator windings.

In accordance with the invention, both the stator windings of the motor and the lower connector part thereof are embedded in a continuous sealing compound which is resistant to humidity, vapors, and gamma radiation, with this lower connector part being secured either to the terminal box or connected to the motor housing, and the upper connector part, in which the current supply cable terminates, being also pressure- and vapor-tightly sealed.

The sealing compound used for this purpose comprises a thermoplastic casting resin having the property of absorbing any stresses which are produced by heating and cooling, and thus compensating for the varying expansions connected thereto of the different materials of the motor parts. Dangerous pressures on the insulation and wires are thereby eliminated, since with an increasing temperature, the casting resin becomes more elastic without softening. The thermal conductivity of the casting resin is unusually high. The temperature of the motor winding therefore remains far below the highest permissible level.

With a suitable shape of the stator housing, the lower connector part may be flanged directly to the motor, so that then a terminal box accommodating the plug strip may be omitted. In such a case, the connections from the stator winding are directly attached by screwing and crimping to the connector pins of the lower connector part and are also embedded in the sealing compound. The connector pins projecting from the plug strip are kept out of contact with the sealing compound, since they must remain free, to be plugged into the female, upper connector part. In connected state, the entire plug connection is pressure- and vapor-tight, so that no humidity can penetrate from the outside to the contacting elements.

Accordingly, it is an object of the invention to provide an improved protective arrangement for electric motors which are operated in a humid ambience or vapor filled atmosphere and in a gamma radiation field, wherein the stator windings are conducted through a connector box which is filled with an embedding sealing compound which covers the stator windings in the housing and extends outwardly through an opening of the housing into the connector which includes two plug type interconnectable connector parts.

A further object of the invention is to provide an improved motor construction which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and specific matter in which preferred embodiments of the invention are illustrated.

BRIEF DESCRIPTION OF THE DRAWINGS

In the drawings:

FIG. 1 is a longitudinal sectional view of a three phase motor having a terminal box mounted thereon and including a contacting device constructed in accordance with the invention;

FIG. 2 is a view taken along the line A—A of FIG. 1; and

DESCRIPTION OF THE PREFERRED EMBODIMENTS

Figure 3:
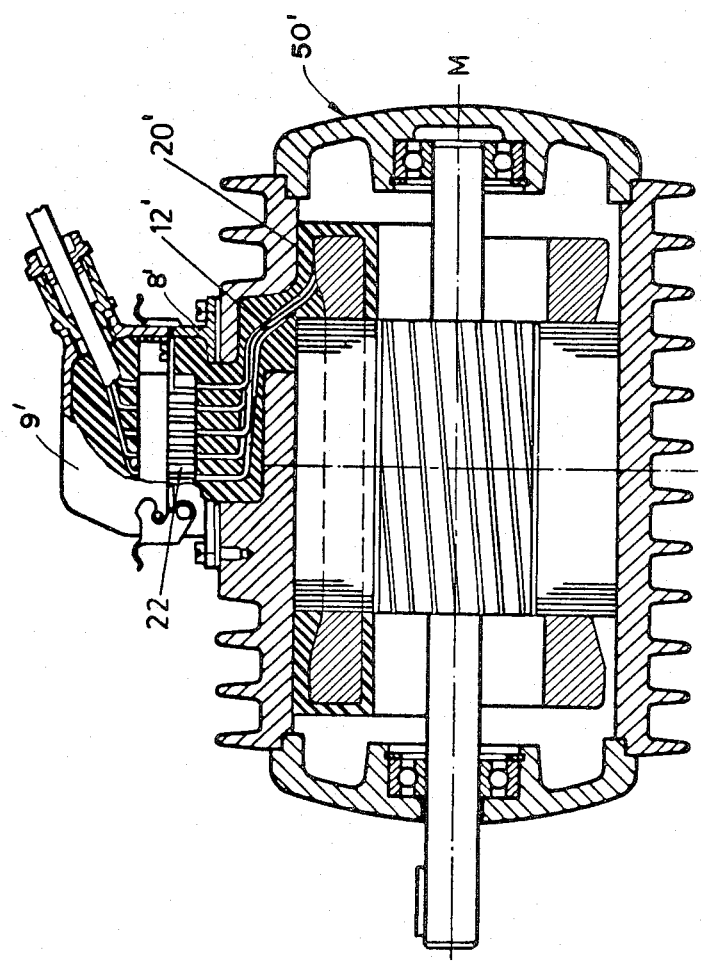
FIG. 3 is a view similar to FIG. 1 of another embodiment of the invention.

Referring to the drawings, in particular the invention embodied therein, comprises an electric motor construction 50 which includes a housing 1 having an opening through a wall thereof through which motor stator winding ends or leads 12 are directed from a stator winding 15 which surrounds a rotor 3 of the motor which is rotatably mounted in the motor within the housing.

In the upper part of FIG. 1, a sealed motor part with a terminal box 6 and the lower or male part of a connector is shown for the motor 50. In the lower part of FIG.

1, below central axis M of the motor, a non-sealed winding is shown.

In accordance with a conventional design, the motor comprises a housing 1, a stator 2, a rotor 3, and two bearing brackets 4,5 forming end parts of the housing. A terminal box 6 is mounted on the motor housing, and the lower or male connector part 8 is secured to the cover 7 of the terminal box. An upper or female connector part 9 is engaged with the lower connector part 8 and secured by a snap-action lock 17. A current-supply cable 10 is fixed to upper connector part 9 through a Pg-screw connection.

The coil ends of the motor stator winding 15 are completely embedded in the casting resin. Connections 12 of the motor winding 15 are applied to a terminal strip 13 of the motor, and wires 23 are led therefrom to a pin insert 14 in the lower connector part 8. An upper connector part 9, which has a socket insert 18, is also filled with the sealing compound, at the rear side 24 of insert 18.

In the shown connected state, lower and upper connector parts 8 and 9 are sealed against vapor and humidity penetration by a gasket 19.

As shown in FIG. 2, the grooves 16 of stator 2 of the sealed motor part are also completely filled up with a casting compound. In contrast thereto, stator grooves 21 of a nonsealed motor, as shown in the lower part of FIG. 2, below central axis M, would be exposed to vapors which might be present.

FIG. 3 shows an embodiment of a motor 50' where coil connections 12' are directly electrically connected to connector pins 22, thus without an interposed terminal strip, and embedded in a sealing compound 20'. This arrangement is space saving and simpler in construction, and also less expensive than the embodiment of FIG. 1 with a terminal box.

While specific embodiments of the invention have been shown, and described in detail to illustrate the application of the principles of the invention, it will be understood that the invention may be embodied otherwise without departing from such principles.

What is claimed is:

1. An electric motor construction for nuclear plants, comprising: a housing; a motor rotor rotatably mounted in said housing; a stator with a plurality of grooves and stator windings, said stator disposed in said housing and around said rotor; said housing having a wall with an opening therein; a terminal box plug connected to said stator windings mounted on said wall around said opening including upper and lower interengageable connector parts with a plurality of cables extending through said upper and lower interengageable connector parts; a sealing gasket between said upper and lower interengageable parts; said stator windings having lead wires leading from said housing to said connector parts and connected to said cables at a connection; first continuous sealing compound resistant to humidity, vapor and gamma radiation, embedding said stator windings, said lead wires, said connection, at least a part of said cables and filling said grooves, said first continuous sealing compound extending from said housing into said connector parts; and a second continuous sealing compound resistant to humidity, vapor and gamma radiation, embedding upper portions of said cables in said upper interengageable connector part above said gasket, said first continuous sealing compound extending in said lower interengageable connector part up to said gasket and said second continuous sealing compound filling an upper portion of said upper interengageable connector part and extends down to a location above said gasket.

2. An electric motor construction according to claim 1, wherein said connected parts include a lower part mounted directly on said housing and an upper part interengaged with said lower part and snap lock means extending between said upper and lower parts and locking said parts in position.

3. An electic motor construction according to claim 1, including a terminal box mounted on said wall between said upper and lower interengageable connector parts, a terminal strip mounted on said wall in said terminal box connected to said lead wires of said stator windings, and connector wires connected to said terminals and extending into said connector parts.

4. An electric motor construction according to claim 3, including a connector pin insert in said connector parts interconnecting said terminal wires of said stator coils.

5. An electric motor construction according to claim 4, wherein said housing includes two end wall portions defining rotor bearings for said rotor.

* * * * *